Feb. 19, 1963      B. P. KANG      3,078,333

HIGH VOLTAGE POWER CABLE

Filed Dec. 24, 1959      2 Sheets-Sheet 2

INVENTOR
Bun P. Kang
BY
Pennie, Edmonds, Morton, Barrows & Taylor
ATTORNEYS

United States Patent Office 3,078,333
Patented Feb. 19, 1963

3,078,333
HIGH VOLTAGE POWER CABLE
Bun P. Kang, Hastings on Hudson, N.Y., assignor to Anaconda Wire and Cable Company, a corporation of Delaware
Filed Dec. 24, 1959, Ser. No. 861,815
11 Claims. (Cl. 174—120)

This invention relates to electric power cables and, more particularly, to power cables having a metallic conductor surrounded by insulation which is impregnated with a dielectric cable oil. The invention provides an improved oil-impregnated electric power cable which may be operated at high voltages and over sustained periods of time without risk or danger of the oil-impregnated insulation failing due to electrical stress.

Although a large number of synthetic polymers possess excellent chemical, physical, and electrical properties which suggest their use as insulating materials for high voltage power cables carrying relatively large currents, their use for this purpose has been limited due to the difficulties which occur in impregnating sheets or tapes of the polymer with a dielectric cable oil. Because tapes of these polymers invariably are quite impervious to the dielectric fluid, it is impossible to impregnate a tightly wound wrapping with cable oil without leaving numerous small air gaps or cavities which become focal points for ionization, the ultimate result of which is electrical failure of the cable.

Using a dielectric tape consisting essentially of a thin, porous sheet of cellulosic paper laminated to a thin, impervious film or sheet of either polytetrafluoroethylene, polypropylene, polycarbonates, polyethylene, or an interpolymer or copolymer thereof, in which the cellulosic paper is either chemically bonded or held by mechanical force to the polymer film, I have found that it is possible to completely and thoroughly impregnate a tightly wound wrapping of this tape with a dielectric cable oil so that no air or other gas bubbles or voids are formed or entrapped in the wrapping. The cellulosic paper laminae apparently furnish capillary paths through which the oil impregnant can penetrate into and fill all of the voids in the wrapping. By applying the wrapping tapes with a negative butt lap, or even with the edges of the tapes overlapping, so that slight helical fissures are created between adjacent turns of the tape, each successive layer of the paper laminae will be interconnected by passages permitting easy penetration of the dielectric cable oil throughout the wrapping.

Accordingly, a cable of the character contemplated by this invention comprises a metallic conductor surrounded by insulation comprising an oil-permeable helical wrapping of a laminated dielectric tape and a dielectric cable oil impregnated into and filling the pores and interstices of the wrapping. The dielectric tape consists essentially of a thin, porous sheet of cellulosic paper laminated to an impervious film of a normally solid polymer selected from the group consisting of polytetrafluoroethylene, polypropylene, polycarbonates, polyethylene, and interpolymers and copolymers thereof. The dielectric tape may be a pre-laminated tape formed by chemically bonding the polymer to the cellulosic paper prior to wrapping about the conductor, or it may be laminated in the course of forming the body of insulation about the conductor by wrapping alternate layers of paper and polymer about the conductor. The term "laminate" is used herein to define both types of structures. In either case, the wrapping tape is preferably applied with a negative butt lap at the adjacent edges of polymer laminae, that is, the edges of the polymer are spaced slightly apart from, rather than overlapping, but it may be applied with edges overlapping.

No matter what wrapping procedure is used, slight helical fissures exist between adjacent turns of the tape and provide passages interconnecting successive layers of the cellulosic paper laminae, thereby permitting easy penetration of the dielectric cable oil throughout the wrapping. A protective sheath advantageously surrounds the insulation.

The laminated dielectric tapes which are suitable for use in the high voltage power cable of the invention are formed by laminating or bonding a thin film or sheet of the polymer (polytetrafluoroethylene, polypropylene, polycarbonates, polyethylene, or an interpolymer or copolymer thereof) over the full width of the tape to a thin porous sheet of cellulosic paper; or, alternatively, the polymer is laminated to the paper over a substantially longitudinal central portion of the tape, leaving at least one narrow marginal edge portion of the paper projecting beyond the edge of the polymer laminae. As indicated previously, the polymer and paper layers in these laminated dielectric tapes are either pre-laminated, as by being chemically bonded together prior to wrapping about the conductor, or are laminated in the course of forming the body of insulation about the conductor by wrapping separately alternate layers of paper and polymer about the conductor, in which case these layers are held together by mechanical force. The dielectric strength of the paper-polymer laminated structures is substantially the same in both cases. As a general rule, the insulating quality of these laminated tapes is higher than that of paper alone, so that the maximum working voltage at which the cable may be operated is correspondingly higher for a given thickness of insulation than that obtained with oil impregnated paper-insulated cables of similar design. To illustrate this rule, Table I sets forth the electrical properties of cellulosic paper as well as that of several paper-polymer laminates at various temperatures. In each instance, the dielectric strength of the paper-polymer laminant is markedly higher than that of the paper alone. In addition, the dielectric constants of the laminated tapes are generally close to the dielectric constants of the common liquid dielectric impregnants (hydrogen cable oils), so that the resultant impregnated insulation is considerably more electrically homogeneous than oil-impregnated paper insulation.

TABLE I

Electrical Properties of Cellulosic Paper and Paper-Polymer Laminates at Various Temperatures

| Property | Cellulosic paper | | Polytetrafluoroethylene laminated to paper | | Polycarbonates laminated to paper | |
|---|---|---|---|---|---|---|
| | 85° C. | 100° C. | 85° C. | 100° C. | 85° C. | 100° C. |
| Dielectric constant | 2.43 | 2.42 | 2.00 | 1.99 | 2.72 | 2.73 |
| Power factor (percent) | 0.140 | 0.182 | 0.107 | 0.126 | 0.105 | 0.155 |
| Loss factor (percent) | 0.340 | 0.440 | 0.214 | 0.251 | 0.286 | 0.422 |
| Dielectric strength (Volts/mil at 23° C.) | 1,925 | | 2,698 | | 2,692 | |

The insulation must be thoroughly impregnated with the dielectric cable oil without entrapment of any air bubbles in the wrapping, for air bubbles are focal points for ionization and electrical failure of the cable. Various types of dielectric cable oils may be employed in the power cables of this invention. In general, these dielectric cable oils are either hydrocarbon oils isolated from petroleum distillates, one example of which is the naphthenic-base mineral oils, or they are prepared from synthetic dielectric fluids, such as the silicone oils or organo-silicon fluids. When a hydrocarbon cable oil is used, it may be blended with a purified rosin or with a high molecular weight polymer, such as polyisobutylene, but for most purposes the unblended naphthenic-base mineral oils are preferred, since in general they are more resistant to decomposition and have better dielectric properties than the blended hydrocarbon oils.

In addition to the hydrocarbon cable oils, particularly satisfactory results have also been obtained by using a synthetic silicone fluid, such as the polysiloxanes, polysilanes, and polysilicate esters, all of which have excellent dielectric properties and, moreover, have virtually no solvating effect on the polymer layer of the laminated dielectric tape. Of these silicone polymers, the fluid polysiloxanes in particular may be singled out for special mention. Since their dielectric constants are so nearly identical to the dielectric constants of the polymers from which the laminated tapes are formed, it is possible to obtain a polysiloxane-impregnated insulation which is considerably more electrically homogeneous than insulation impregnated with other fluid dielectrics.

To illustrate the use of laminated dielectric tapes to form the insulation of a high-voltage power cable in accordance with the invention, three preferred embodiments are described below with reference to the accompanying drawings, in which.

Figure 4:
Figure 5:
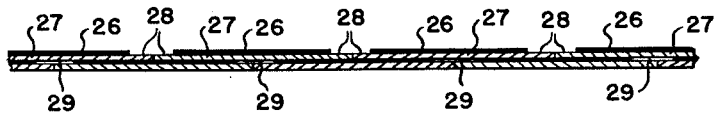

FIG. 4 is a cross-section showing schematically two successive layers of a helical wrapping of tape formed by laminating an impervious film of polypropylene over the full width of the tape to a thin, porous sheet of cellulosic paper, the wrapping being applied with the edges of the tapes overlapping each other; and FIG. 5 is a cross-section showing schematically two successive layers of a helical wrapping of tape applied with a butt lap, the tape comprising an impervious film of polypropylene laminated to a thin, porous sheet of cellulosic paper over a substantially longitudinal central portion of the tape so that narrow marginal edge portions of the paper project beyond the edge of the polypropylene laminae.

Figure 1:
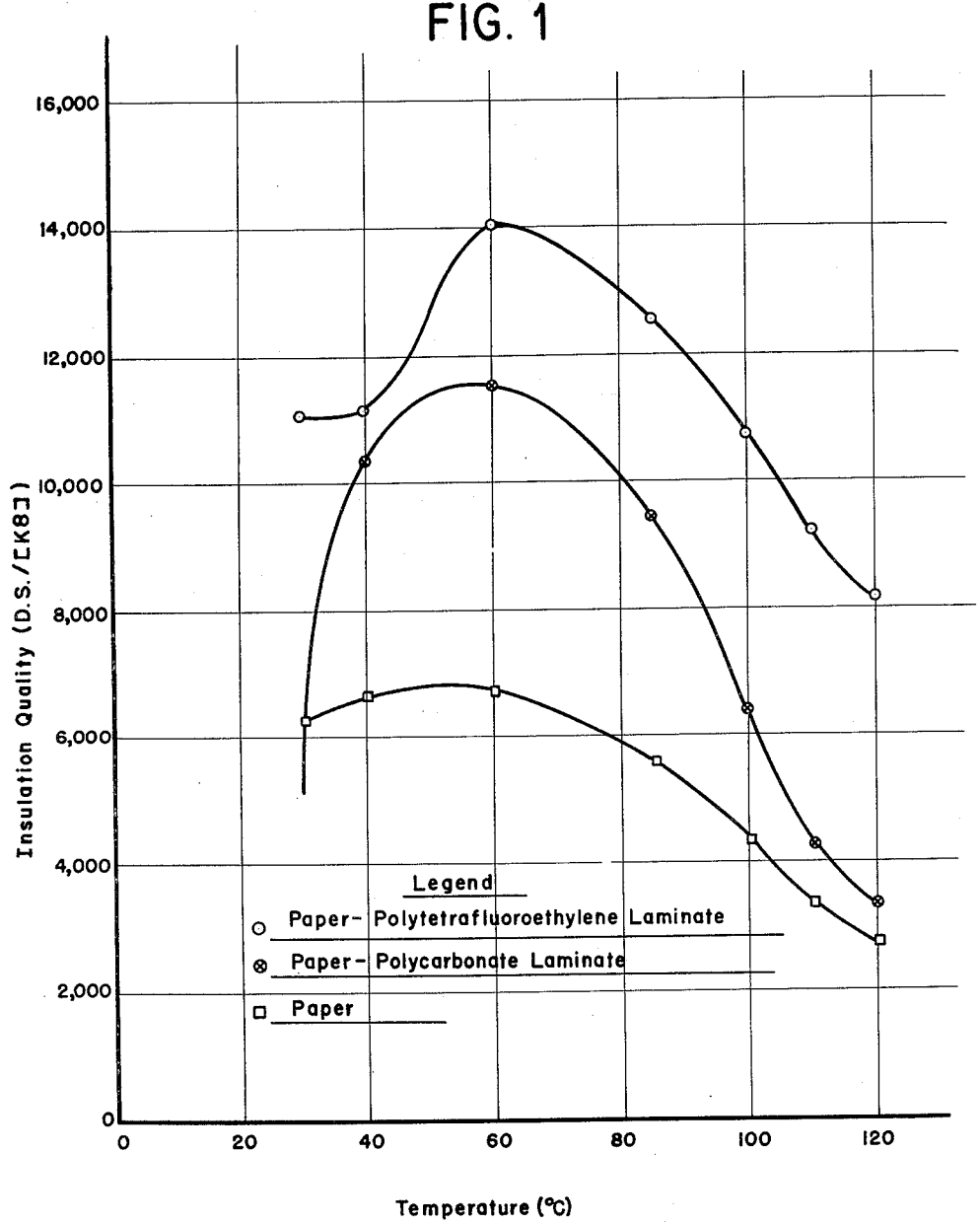
FIG. 1 shows the plotted curves for the initial insulation quality as a function of temperature for cellulosic paper, laminates of cellulosic paper and a polycarbonate, and laminates of cellulosic paper and polytetrafluoroethylene.

The curves depicted in FIG. 1 show the relationship of the service (or insulating) quality of cellulosic paper, laminates of cellulosic paper and a polycarbonate, and laminates of cellulosic paper and polytetrafluoroethylene as a function of temperature, the service quality of insulation being directly related to its dielectric strength and inversely related to its loss factor. Analysis of these curves illustrates the general rule that the service quality of a paper-polymer laminated dielectric tape is invariably higher than that of the paper alone. Thus, the service quality of a laminate of polytetrafluoroethylene and cellulosic paper is 2.46 times that of the paper alone, while the service quality of a laminate of cellulosic paper and a polycarbonate is 1.46 times that of paper, demonstrating the unique advantages of using a paper-polymer laminate in a high voltage electric power cable.

Figure 2:
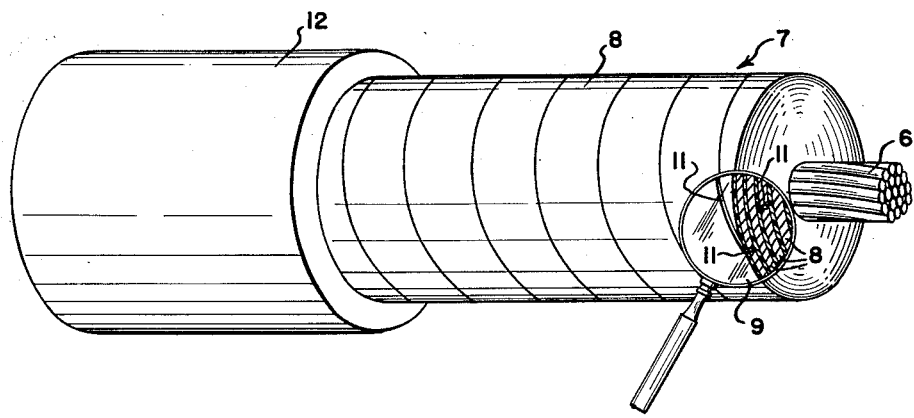
FIG. 2 is an isometric view of a single-conductor power cable in which the conductor is covered by a solid layer comprising an oil-permeable wrapping of a tape consisting essentially of cellulosic paper laminated to polypropylene and a dielectric cable oil impregnated throughout the wrapping, a portion of the exposed cross-section of the wrapping being magnified to show its construction in detail.

The cable shown in FIG. 2 is a single-conductor cable having a central stranded conductor 6 surrounded throughout its entire length by an oil-permeable covering 7 composed of many layers of helically wrapped laminated dielectric tape 8 which forms a continuous concentric insulating layer about the conductor. Although a single conductor cable is shown for the purpose of illustration in the accompanying drawing, it is undersoood that the invention is equally applicable to a cable having two or more conductors, each of which may be separately insulated by individual layers of the laminated dielectric tape.

The tape 8, which is freely permeable to cable oil, is formed from a thin porous sheet of cellulosis paper laminated over the full width of the tape to an impervious sheet or film of polypropylene, the cellulosic paper laminae in this composite tape defining a multiplicity of small oil-permeable channels disposed in the tape wrappings into and through which the cable oil may easily penetrate. To illustrate the construction of the insulating covering 7 in detail, a portion 9 of the exposed cross-section of the wrapping is shown on a magnified scale.

As shown in the magnified portion 9 of the wrapping, the tapes 8 are applied with their edges spaced apart so that gaps or fissures 11 always exist between adjacent turns. These fissures, in cooperation with the paper laminae, permit the cable oil to penetrate from layer to layer through the entire body of the insulation. Since the distance between adjacent paper laminae is small, a film of the cable oil also penetrates between the face-to-face surfaces of adjoining turns of the tape so that all voids originally present become filled with the dielectric fluid. As a result, after the helical wrapping is thoroughly impregnated with the cable oil, the insulation surrounding the conductor becomes a mass of solid dielectric tape and impregnant which is substantially completely free of voids.

The helically wrapped tape is impregnated throughout with a dimethylpolysiloxane liquid having a viscosity, at 25° C. in the range from 0.6 to 30,000 centistokes and a dielectric constant in the range from 2.2 to 2.8. The wrapped conductor is first placed in an impregnating tank and dried under vacuum at a temperature in the range between 100° C. and 130° C. After the conductor has been thoroughly dried, the impregnating liquid (polysiloxane or any other liquid dielectric impregnant) is gradually introduced into the tank while still under vacuum until the liquid level is at least 6 inches above the wrapped conductor, after which the tank is alternatively subjected to vacuum and pressure cycles until all residual air is completely removed and the impregnating liquid saturates all voids and interstices in the porous wrapping. Thereafter, a protective sheath 12 is applied about the polysiloxane-impregnated wrapping throughout substantially the entire length of the cable.

Figure 3:
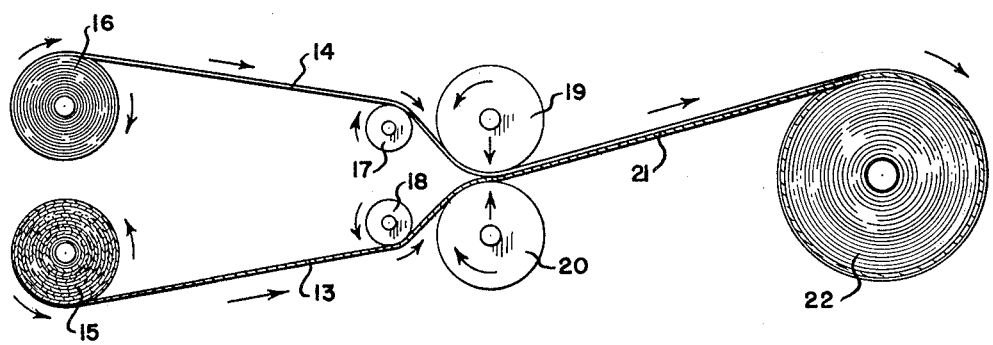
FIG. 3 is a schematic view illustrating the manufacture of a roll of tape comprising laminated layers of cellulosic paper and polypropylene.

To form a laminated dielectric tape suitable for use in the high voltage power cable of the invention, an impervious sheet or film of the polymer (polytetrafluoroethylene, polypropylene, polycarbonates, polyethylene, or any interpolymer or copolymer thereof) is laminated or bonded over the full width of the tape or, alternatively, over a substantially longitudinal central portion of the tape to a thin, porous sheet of cellulosic paper. In the latter instance, the laminated tape is left with at least one narrow marginal edge portion of the paper projecting beyond the edge of the polymer laminae. As schematically illustrated in FIG. 3, the tape is formed by bonding together two separate tapes 13 and 14 shown issuing from corresponding supply rolls 15 and 16. One of the tapes 13 is a thin, narrow, porous strip of cellulosic paper, while the other tape 14 is a sheet or film of polypropylene which is impervious to the dielectric cable oil. The polypropylene tape 14 is drawn from roll 16 over a guide roller 17 and converges with the paper tape 13, which is drawn over a corresponding guide roller 18, between a pair of rollers 19 and 20. Sufficient heat and pressure are applied by these latter rollers to bond the two tapes 13 and 14 into a composite laminated tape 21 without seriously impairing the permeability of the porous (paper) component 13. For convenience, the composite laminated tape 21 is wound into a roll 22.

A multiplicity of layers of the laminated tape 21, the manufacture of which is schematically illustrated in FIG. 3, are helically wrapped about a conductor to form an insulating covering thereon of the character shown in FIGS. 4 and 5, both of which show in schematic fashion two successive layers of the helical wrapping. In FIG. 4, the composite tape, which consists of an impervious film of polypropylene 23 laminated over the full width of the tape to a thin, porous sheet of cellulosic paper 24, is applied with its edges overlapping so that slight helical fissures or gaps 25 are created between adjacent turns of the tape, thereby interconnecting each successive layer of the paper laminae 24 by passages permitting easy penetration of the dielectric cable oil through the wrapping.

FIG. 5 illustrates a helical wrapping in which the composite tape consists of a film of polypropylene 26 laminated or bonded to a thin, porous sheet of cellulosic paper 27 leaving narrow marginal edge portions 28 of the paper projecting beyond the edge of the polypropylene laminae 26. This tape is helically applied to the conductor with a butt lap (as shown) or with a negative butt lap so that its edges abut or are spaced slightly apart from the adjoining turns to form a gap between them. Gaps 29, which occur between adjacent edges of the polypropylene laminae in successive turns of the wrapping, in cooperation with the porous paper laminae 27, permit the dielectric cable oil to penetrate from layer to layer through the entire body of the insulation.

In the foregoing embodiments of the invention particular reference has been made to the use of dimethylpolysiloxane fluid to impregnate the helical wrappings of laminated tape surrounding the metallic conductor. Various other dielectric cable oils, such as the hydrocarbon cable oils, or various other fluid organosilicon polymers, such as the phenylmethylpolysiloxanes, the diphenylpolysiloxanes, the polysilanes, or even the polysilicate esters, may also be employed as the fluid impregnant in place of (or, in some cases, in admixture with) these dimethylpolysiloxanes.

Although a single conductor power cable has been illustrated, the new cable of the invention may have three, or any other desired number, conductors. Moreover, the cable structure may contain one or more electrostatic shields as well as various other cable elements which are neither shown nor described above, and may be either a fluid-filled, gas-filled, or gas-pressure type of power cable rather than the relatively simple solid type of power cable illustrated in the drawings.

I claim:

1. A high voltage electric power cable comprising a metallic conductor surrounded by insulation comprising an oil-permeable helical wrapping of a composite laminated dielectric tape and a dielectric cable oil impregnated into and filling the pores and interstices of the wrapping, the composite dielectric tape consisting essentially of a thin porous sheet of cellulosic paper laminated to an impervious film of a normally solid polymer of the group consisting of polytetrafluoroethylene, polypropylene, polycarbonates, polyethylene, and interpolymers and copolymers thereof, the wrapping having slight helical fissures existing therein between adjacent turns of the tape providing passages between successive layers of the cellulosic paper laminae and thereby permitting easy penetration of the cable oil throughout the wrapping.

2. A high voltage electric power cable comprising a metallic conductor surrounded by insulation comprising an oil-permeable helical wrapping of a composite laminated dielectric tape and a dielectric cable oil impregnated into and filling the pores and interstices of the wrapping, the composite dielectric tape consisting essentially of a thin porous sheet of cellulosic paper laminated over the full width of the tape to an impervious film of a normally solid polymer of the group consisting of polytetrafluoroethylene, polypropylene, polycarbonates, polyethylene, and interpolymers and copolymers thereof, the wrapping having slight helical fissures existing therein between adjacent turns of the tape providing passages between successive layers of the cellulosic paper laminae and thereby permitting easy penetration of the cable oil throughout the wrapping.

3. A high voltage electric power cable comprising a metallic conductor surrounded by insulation comprising an oil-permeable helical wrapping of a composite laminated dielectric tape and a dielectric cable oil impregnated into and filling the pores and interstices of the wrapping, in which the composite dielectric tape is a thin impervious layer of polytetrafluoroethylene laminated to a thin porous sheet of cellulosic paper over the full width of the tape, the wrapping having slight helical fissures existing therein between adjacent turns of the tape providing passages between successive layers of the cellulosic paper laminae and thereby permitting easy penetration of the cable oil throughout the wrapping.

4. A high voltage electric power cable comprising a metallic conductor surrounded by insulation comprising an oil-permeable helical wrapping of a composite laminated dielectric tape and a dielectric cable oil impregnated into and filling the pores and interstices of the wrapping, in which the composite dielectric tape is a thin impervious layer of polypropylene laminated to a thin porous sheet of cellulosic paper over the full width of the tape, the wrapping having slight helical fissures existing therein between adjacent turns of the tapes providing passages between successive layers of the cellulosic paper laminae and thereby permitting easy penetration of the cable oil throughout the wrapping.

5. A high voltage electric power cable comprising a metallic conductor surrounded by insulation comprising an oil-permeable helical wrapping of a composite laminated dielectric tape and a dielectric cable oil impregnated into and filling the pores and interstices of the wrapping, in which the composite dielectric tape is a thin impervious layer of a polycarbonate laminated to a thin porous sheet of cellulosic paper over the full width of the tape, the wrapping having slight helical fissures existing therein between adjacent turns of the tape providing passages between successive layers of the cellulosic paper laminae and thereby permitting easy penetration of the cable oil throughout the wrapping.

6. A high voltage electric power cable comprising a metallic conductor surrounded by insulation comprising an oil-permeable helical wrapping of a composite laminated dielectric tape and a dielectric cable oil impregnated into and filling the pores and interstices of the wrapping, in which the composite dielectric tape is a thin impervious layer of polyethylene laminated to a thin porous sheet of cellulosic paper over the full width of the tape, the wrapping having slight helical fissures existing therein between adjacent turns of the tape providing passages between successive layers of the cellulosic paper laminae and thereby permitting easy penetration of the cable oil throughout the wrapping.

7. A high voltage electric power cable comprising a metallic conductor surrounded by insulation comprising an oil-permeable helical wrapping of a composite laminated dielectric tape and a dielectric cable oil impregnated into and filling the pores and interstices of the wrapping, the composite dielectric tape consisting essentially of an impervious film of a normally solid polymer of the group consisting of polytetrafluoroethylene, polypropylene, polycarbonates, polyethylene, and interpolymers and copolymers thereof, laminated over a substantially longitudinal central portion of the tape to a thin porous layer of cellulosic paper, at least one marginal edge portion of the paper layer projecting beyond the edge of the polymer lamina, whereby the wrapping is formed with slight helical fissures existing therein between adjacent turns of the polymer laminae providing passages between successive layers of the cellulosic paper laminae and thereby permitting easy penetration of the cable oil throughout the wrapping.

8. A high voltage electric power cable comprising a metallic conductor surrounded by insulation comprising an oil-permeable helical wrapping of a composite laminated dielectric tape and a dielectric cable oil impregnated into and filling the pores and interstices of the wrapping, the composite dielectric tape consisting essentially of an impervious film of polytetrafluoroethylene laminated over a substantially longitudinal central portion of the tape to a thin porous layer of cellulosic paper, at least one marginal portion of the paper layer projecting beyond the edge of the polytetrafluoroethylene lamina, whereby the wrapping is formed with slight helical fissures existing therein between adjacent turns of the polytetrafluoroethylene laminae providing passages between successive layers of the cellulosic paper laminae and thereby permitting easy penetration of the cable oil throughout the wrapping.

9. A high voltage electric power cable comprising a metallic conductor surrounded by insulation comprising an oil-permeable helical wrapping of a composite laminated dielectric tape and a dielectric cable oil impregnated into and filling the pores and interstices of the wrapping, the composite dielectric tape consisting essentially of an impervious film of polypropylene laminated over a substantially longitudinal central portion of the tape to a thin porous layer of cellulosic paper, at least one marginal edge portion of the paper layer projecting beyond the edge of the polypropylene lamina, whereby the wrapping is formed with slight helical fissures existing therein between adjacent turns of the polypropylene lamina providing passages between successive layers of the cellulosic paper laminae and thereby permitting easy penetration of the cable oil throughout the wrapping.

10. A high voltage electric power cable comprising a metallic conductor surrounded by insulation comprising an oil-permeable helical wrapping of a composite laminated dielectric tape and a dielectric cable oil impregnated into and filling the pores and interstices of the wrapping, the composite dielectric tape consisting essentially of an impervious film of a polycarbonate laminated over a substantially longitudinal central portion of the tape to a thin porous layer of cellulosic paper, at least one marginal edge portion of the paper layer projecting beyond the edge of the polycarbonate laminae, whereby the wrapping is formed with slight helical fissures existing therein between adjacent turns of the polycarbonate laminae providing passages between successive layers of the cellulosic paper laminae and thereby permitting easy penetration of the cable oil throughout the wrapping.

11. A high voltage electric power cable comprising a metallic conductor surrounded by insulation comprising an oil-permeable helical wrapping of a composite laminated dielectric tape and a dielectric cable oil impregnated into and filling the pores and interstices of the wrapping, the composite dielectric tape consisting essentially of an impervious film of polyetheylene laminated over a substantially longitudinal central portion of the tape to a thin porous layer of cellulosic paper, at least one marginal edge portion of the paper layer projecting beyond the edge of the polyethylene laminae, whereby the wrapping is formed with slight helical fissures existing therein between adjacent turns of the polyethylene laminae providing passages between successive layers of the cellulosic paper laminae and thereby permitting easy penetration of the cable oil throughout the wrapping.

References Cited in the file of this patent

UNITED STATES PATENTS

| | | |
|---|---|---|
| 2,135,315 | Walters et al. | Nov. 1, 1938 |
| 2,309,992 | Scott et al. | Feb. 2, 1943 |
| 2,314,694 | Dodds | Mar. 23, 1943 |
| 2,320,922 | Ford | June 1, 1943 |
| 2,454,625 | Bondon | Nov. 23, 1948 |
| 2,650,261 | Davey | Aug. 25, 1953 |

FOREIGN PATENTS

| | | |
|---|---|---|
| 355,291 | Great Britain | Aug. 21, 1931 |
| 439,345 | Great Britain | Dec. 4, 1935 |
| 456,139 | Canada | Apr. 26, 1949 |
| 553,596 | Italy | Dec. 28, 1956 |
| 773,563 | Great Britain | Apr. 24, 1957 |

UNITED STATES PATENT OFFICE
CERTIFICATE OF CORRECTION

Patent No. 3,078,333　　　　　　　　　　　　February 19, 1963

Bun P. Kang

It is hereby certified that error appears in the above numbered patent requiring correction and that the said Letters Patent should read as corrected below.

Column 4, line 3, for "purpose" read -- purposes --; line 10, for "cellulosis" read -- cellulosic --; column 6, line 33, for "tapes" read -- tape --.

Signed and sealed this 8th day of October 1963.

(SEAL)
Attest:

ERNEST W. SWIDER
Attesting Officer

EDWIN L. REYNOLDS
Acting Commissioner of Patents